Aug. 25, 1942.　　　J. J. HARDENBERG ET AL　　　2,293,821
CINEMATOGRAPHIC PROJECTION DEVICE
Filed June 12, 1940　　　3 Sheets-Sheet 1
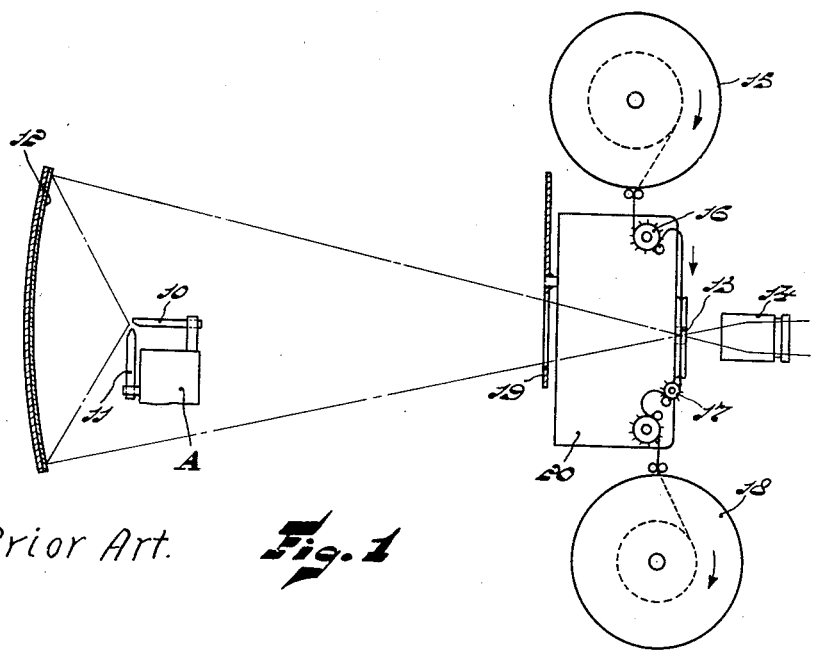
Prior Art.　Fig. 1
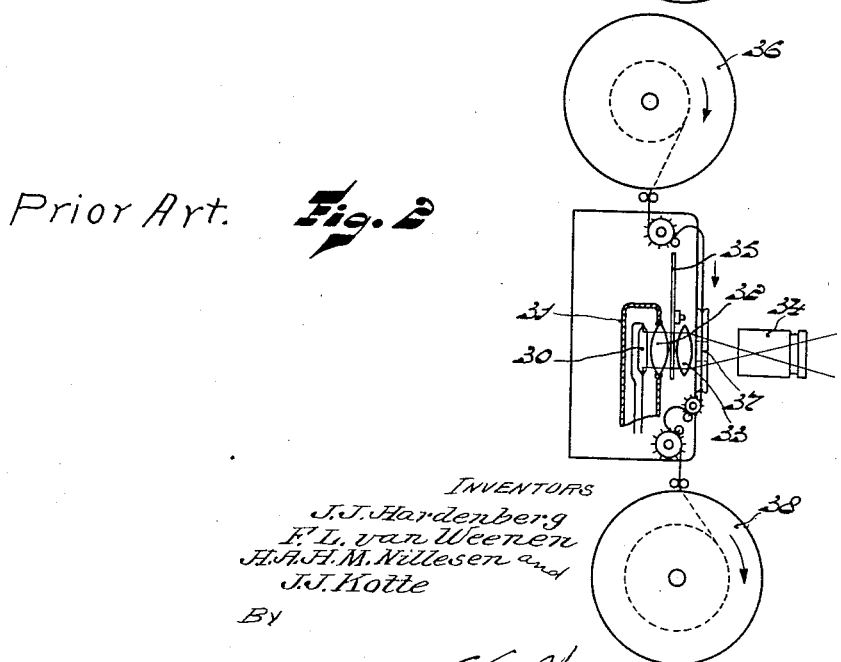
Prior Art.　Fig. 2
INVENTORS
J. J. Hardenberg
F. L. van Weenen
H. A. H. M. Nillesen and
J. J. Kotte
BY
E. F. Wendiroth
ATTORNEY Aug. 25, 1942.   J. J. HARDENBERG ET AL   2,293,821
CINEMATOGRAPHIC PROJECTION DEVICE
Filed June 12, 1940   3 Sheets-Sheet 2
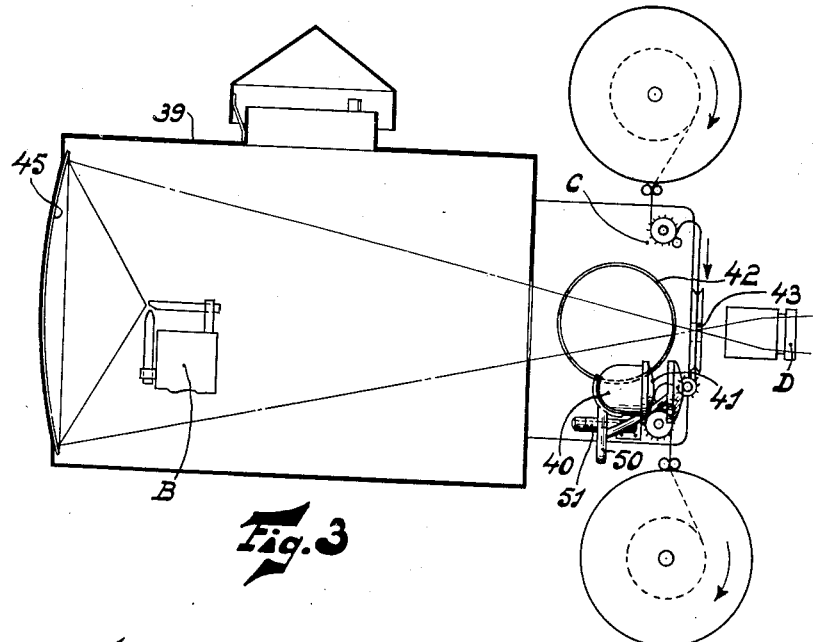
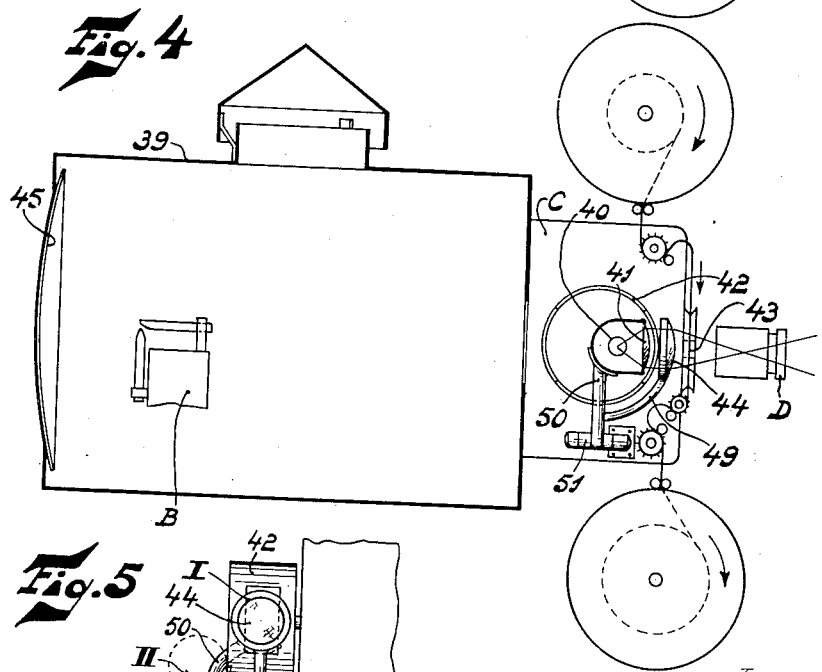
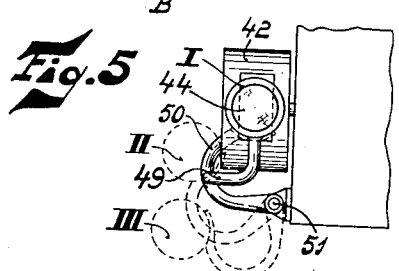

Aug. 25, 1942.  J. J. HARDENBERG ET AL  2,293,821
CINEMATOGRAPHIC PROJECTION DEVICE
Filed June 12, 1940  3 Sheets-Sheet 3
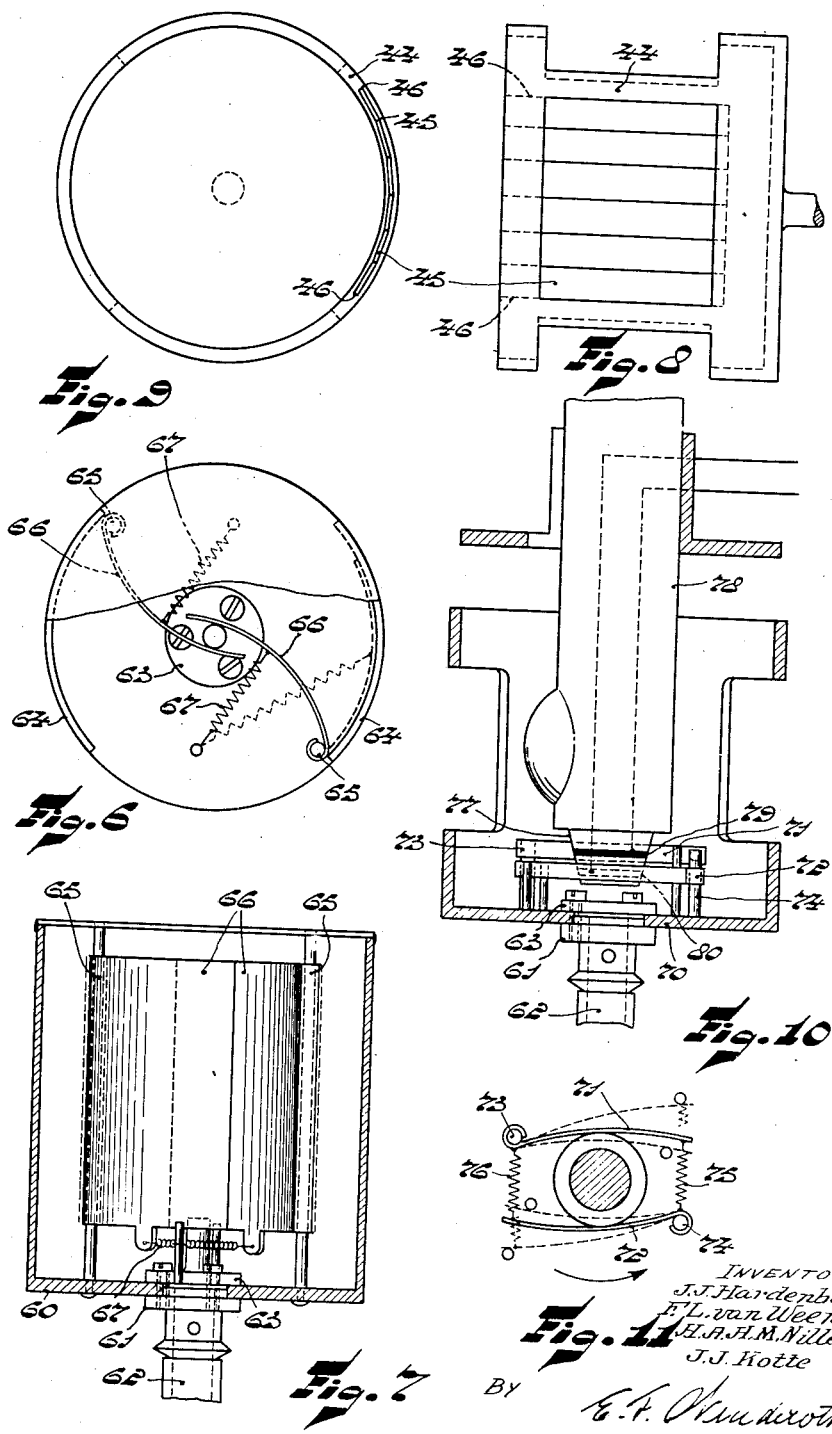

Patented Aug. 25, 1942

2,293,821

UNITED STATES PATENT OFFICE 2,293,821

CINEMATOGRAPHIC PROJECTION DEVICE

Jan Jesayas Hardenberg, Franciscus Lambertus Van Weenen, Hendrik Antoon Hubert Marie Nillesen, and Jan Jacob Kotte, Eindhoven, Netherlands, assignors, by mesne assignments, to Hartford National Bank and Trust Company, Hartford, Conn., as trustee Application June 12, 1940, Serial No. 340,194
In the Netherlands December 2, 1939

5 Claims. (Cl. 88—24)

Cinematographic projection devices comprising an arc-lamp as a source of light are known, as well as projection devices using a liquid-cooled high-pressure mercury-vapour lamp with contracted discharge path, which will briefly be referred to hereinafter as a "mercury lamp." Both light sources permit a projection light-flux of at least 3000 lumen. The term "projection light-flux" is to be understood in this case to mean the beam which is thrown through the projection opening upon the film gate at the time of projection of the picture on the screen.

It has appeared desirable to design a projection device of the indicated light intensity, in which either one or the other light source may be used separately. However, with this design, several difficulties are encountered, originating on the one hand from the fact that the path of rays in the arc-lamp projector is essentially different from that in the mercury-lamp projector and on the other hand from the circumstance that the mercury lamp must be cooled by a liquid and must be capable of being easily replaced during operation, whereas this is not the case for the arc-lamp. Thus the light from the arc-lamp is concentrated on the film gate and that from the mercury lamp is concentrated on the objective, which imposes conditions on the optical system and the interrupting devices, which are completely different. The shutter for the arc-lamp must permit a rapid interruption of the light-flux; to this end, the disc must have a large diameter, due to which it has to be arranged behind the driving mechanism at a considerable distance from the gate. The mercury lamp generally operates with two lenses, one cooled and one not cooled lens, which are placed as closely to the gate as possible. In order to safeguard the uncooled lens from excessive heating, the shutter moves between the two lenses, which means that the shutter also will have to be arranged near the projection opening, which causes difficulty in the construction in view of the driving mechanism. Furthermore it is desirable that the shutter for the mercury lamp should be provided with coloured windows. Finally the liquid cooling for the mercury lamp will require a special arrangement for the holder of this lamp, which arrangement is entirely different from that of the arc-lamp. The holder will also have to be easily accessible to replace the mercury lamp quickly if desired.

The picture projection-device according to the invention comprises an arc-lamp, a holder for a liquid-cooled-high-pressure mercury-vapour lamp with contracted discharge path (hereinafter briefly referred to as the "mercury lamp"), which holder may be moved into and out of the path of rays of the arc-lamp, and a barrel shutter arranged in the proximity of the projection opening, this construction being such that the mercury vapour lamp in its operating position is arranged in the interior of the barrel shutter.

This construction satisfies the essential condition for the operation of the two light sources. With the path of rays of the arc-lamp, which is normally projected on to the projection screen, as has been described heretobefore, the barrel shutter known in itself offers the advantage of a short shutting time. If the mercury lamp is used in co-operation with the shutter, the arrangement of the latter permits a sufficient protection of the condenser lens present for the projection device. Finally, the barrel shutter is particularly suited to be provided at will with windows either of coloured glass or of opaque material. Besides, in the case of a horizontal arrangement of the barrel shutter, the driving shaft will run parallel with that of the driving sprockets of the film, which means a material simplification from the point of view of the construction. When mention is made of moving the holder into and out of the path of rays, this actually refers to the positions occupied by the mercury lamp mounted in this holder.

According to one embodiment of the invention, the barrel shutter is provided with conductors for interchangeable windows. If, therefore, it is desired to use the projection device for arc-lamps, then opaque screens are mounted in these holders. If, on the contrary, use is made of a mercury lamp, then the holder is provided with coloured, mostly glass windows.

According to another embodiment of this invention, the entire barrel shutter is interchangeable, while further a safety device is provided which is controlled by means of centrifugal force and results in the interruption of the light beam thrown on the projection opening in the case of insufficient speed. This interruption may then take place either by interposition of a screen or by interrupting the electric current.

The holder for the mercury lamp may be made easily displaceable in different manners from the point of view of the construction. Thus, it is possible to place this holder on an arm hinged on the side-wall of the drive casing. If desired, the condenser lens present between the shutter and the projection opening may then also be fastened on the same arm, in order to be able by one movement to make the projector adapted either to the arc-lamp or to the mercury lamp.

Another possibility of fastening the holder for the mercury lamp is to incorporate the barrel shutter in a casing whose side is provided with a cover. The holder for the mercury lamp can now be mounted in this cover. By mounting or dismounting the cover, it is possible to bring the holder in the operating position, or not.

In order that the invention may be more clearly understood and readily carried into effect, it will be explained more fully by reference to the accompanying drawings in which:

Fig. 1 shows a diagram of a prior-art projector comprising an arc-lamp.

Fig. 2 is a diagrammatic view of a prior-art projector comprising a mercury lamp.

Fig. 3 shows the projector according to the invention when operating with the arc-lamp and Fig. 4 shows the projector according to the invention when operating with the mercury lamp.

Fig. 5 is a side-view of a detail of the projector of Fig. 4.

Fig. 6 is a side-view of the barrel shutter for the projector.

Fig. 7 is a section of the barrel shutter of Fig. 5.

Fig. 8 is a side-view of one form of construction of the barrel shutter.

Fig. 9 is a side-view of the barrel shutter of Fig. 7,

Fig. 10 shows a section of the barrel shutter, indicating the position of the mercury lamp, Fig. 11 is an automatic switching device for the mercury lamp.

In Fig. 1, A designates an arc-lamp provided with two carbon tips 10 and 11 and a mirror 12. The arrangement of the arc relatively to the mirror is such that the light in the projection opening 13 is concentrated and passes out via an objective 14. The film runs from the delivery spool via a feed sprocket 16 along the projection opening 13 and is drawn past this gate by a Maltese cross sprocket 17, when it is finally spooled on a take-up spool 18. The light-flux must be interrupted during the moments that the film is moved along the projection opening. For this purpose a shutter 19 is provided which is arranged laterally from the casing of the driving mechanism and at a comparatively large distance from the projection gate.

Fig. 2 shows a mercury-lamp projector. The mercury lamp 30 is surrounded by a cooling wall 31 comprising a lens 32. In addition to this lens, there is arranged a condenser lens 33 which concentrates the light originating from the mercury lamp in an objective 34. To protect the lens 33 from too intense heating from the mercury lamp, a shutter 35 is provided between the lenses 32 and 33. By means of the usual Maltese-cross driving mechanism the film is spooled from the delivery spool 36 via the projection gate 37 on the take-up spool 38.

Fig. 3 shows the projector according to the invention. This projector is constituted by a housing 39 for the arc lamp B, a driving mechanism C for the film and the shutter 42 and an objective D. The shutter 42 is made as a barrel shutter having a horizontal axis and is located on the side-wall of the housing of the driving mechanism C. An arm 50 which is rotatable in 51 and to which the holder for the mercury lamp 40 is fastened, is arranged on the same sidewall. The arm 50 may be moved at will in such manner that the lamp is moved into or out of the path of rays of the arc-lamp B. Fig. 4 shows the position in which the lamp is within the path of rays and Fig. 3 that in which it is outside the path of rays. In the position of Fig. 4 for the projection of the picture use will only be made of the mercury lamp and not of the arc-lamp B. The mercury lamp 40 provided with a lens cooled by liquid is now arranged in the interior of the shutter 42. The supply and discharge of water may take place through loose flexible tubes or via the arm 50 and the point of rotation 51. The mains for this supply and discharge are not shown. In addition to the lens 41, there may be arranged a condenser 44 between the shutter 42 and the projection opening 43, this arrangement being such that the light from the mercury lamp 40 is concentrated in the objective D.

Fig. 3 illustrates the same projector but in this case the arm 50 is moved in such manner that the mercury lamp, together with the lens, is arranged outside the path of rays of the arc-lamp and also outside the space enclosed by the barrel shutter. When use is made of the arc-lamp B, the axis of the barrel shutter will be located in the path of rays of this lamp and this light will be quickly interrupted periodically. Since the light from the lamp B may be directed by the mirror 45 so as to be concentrated in the projection opening, the arrangement of the condenser lens 44 is superfluous. If desired, the arm 50 may have an extension 49, due to which this condenser lens may also be brought into and outside the path of rays of the arc-lamp upon movement of the arm 50 (see Fig. 5).

Fig. 4 shows how the barrel shutter rotates between the two lenses 41 and 44 and periodically interrupts the light from the mercury lamp, due to which the lens 44 is protected from excessive heating.

Figs. 8 and 9 show one form of construction of the barrel shutter, recesses or conductors 46 being provided in the walls 44 of this shutter, into which may be positioned windows 45. These windows may consist, at will, either of opaque material, for example a light metal, such as aluminium, or be manufactured from a coloured transparent material. It is not necessary for all the windows to be made of the same material; it is very well possible that this alteration is transparent and opaque. The coloured windows serve to compensate the shortage of light rays of a definite wavelength from the mercury lamp. If the shutter is provided with these conductors, it may serve both for the mercury lamp and for the arc lamp.

It is alternatively possible to arrange the shutter so as to be interchangeable on the shaft of the driving mechanism.

Figs. 6 and 7 show the form of construction of the barrel shutter for use with the arc-lamp. The barrel shutter may be fastened with its bottom surface 60 on a flange 61 of the shaft 62 by means of a press-piece 63. The walls 64 are provided with hinges 65 about which the screens 66 may rotate. When the shutter is at rest, these screens may be drawn in the position of rest by means of springs 67, these screens entirely overlapping each other and preventing the passage of light. When the shutter starts to rotate, the screens 66 will be moved outwardly in the dotted position due to the centrifugal force, with the result that the light can pass again through the openings of the shutter.

The shutter which is suitable for the mercury lamp, is shown in Fig. 10. This shutter is fastened with its bottom surface 70 on the flange 61 of the shaft 62 by means of the press-piece 63. On the bottom of the shutter there are provided electric contacts having the shape of laminations 71 and 72 (see Fig. 11) which are arranged so as to be rotatable in points 73 and 74. In the position of rest of the shutter these laminations will be drawn inwardly as much as possible by springs 75 and 76 and move against the conical end 77 of the mercury lamp 78. The conical end is provided with two conductive contact strips 79 and 80. If now the barrel shutter rotates at a speed higher than a definite minimum, the strips 71 and 72 will move outwardly to such extent as to remain out of contact with the strips 79 and 80. If, however, the speed falls down below a definite minimum, these laminations make contact with the strips, due to which a circuit is closed via the light window of the shutter, which circuit interrupts the current to the lamp by means of a relay (not shown) and stops the machine.

In both constructions of the shutters 60 and 70 the light flux is therefore automatically interrupted, when the speed of the shutter falls below a definite minimum.

As stated above, Figs. 3 and 4 show the positions of the carrier 50, in which the mercury lamp may be brought into and outside the path of rays of the arc-lamp. In the position shown in Fig. 4, the mercury lamp may be readily replaced by a new one. The possibility of doing this quickly is of great importance for the use of the projector, since it may occur that the lamp extinguishes during the projection. The quicker a new lamp can then be inserted, the better. The construction may be made such that the holder for the lamp in the position of the arm 50 shown in Fig. 5 is automatically shut off both from the electric current and from the supply of liquid. According to one practical example of the invention this is only realised in the lowest position III of the arm 50 because therebetween is a position II in which the mercury lamp is not yet arranged in the interior of the barrel but is already connected to the supply of electric current and cooling liquid. This has the great practical advantage that the operator can exactly ascertain if the lamp burns well before arranging it in the barrel of the shutter. Further it is not unimportant that the mercury lamp may be made to burn already with full light intensity outside the barrel shutter without the film itself being set in motion. In fact, the mercury lamp needs some time to burn with full light intensity. If this took place in the barrel shutter, it would be necessary for the film to run already beforehand, in order to prevent it from catching fire by the heat developed by the lamp. If it is possible, however, to ignite the lamp outside the barrel shutter, the film may be caused to run at the moment of pushing the lamp burning with higher light intensity into the barrel shutter.

What we claim is:

1. In a motion picture projector adapted to produce a projection light flux of at least 3,000 lumens, an arc lamp, a barrel shutter arranged in the light beam produced by said arc lamp in the proximity of the projecting opening, a mercury lamp having an operating position within said shutter, and means to move said mercury lamp into and out of its operative position.

2. In a motion picture projector adapted to produce a projection light flux of at least 3,000 lumens, an arc lamp, a barrel shutter arranged in the light beam produced by said arc lamp in the proximity of the projecting opening, a mercury lamp having an operative position within said shutter and means to move said mercury lamp into and out of its operative position, said means including a member supporting said lamp and rotatively mounted on the projector.

3. In a motion picture projector adapted to produce a projection light flux of at least 3,000 lumens, an arc lamp, a barrel shutter arranged in the light beam produced by said arc lamp in the proximity of the projecting opening, a mercury lamp having an operative position within said shutter, means to move said mercury lamp into and out of its operative position, and means on the said shutter for receiving members of translucent material.

4. In a motion picture projector adapted to produce a projection light flux of at least 3,000 lumens, an arc lamp, a barrel shutter arranged in the light beam produced by said arc lamp in the proximity of the projecting opening, a mercury lamp having an operative position within said shutter, means to move said mercury lamp into and out of said position in said shutter, means to artificially cool said mercury lamp with a liquid, and means to automatically interrupt the supply of electric current and cooling liquid to said mercury lamp when the same is placed in a position outside the shutter.

5. In a motion picture projector adapted to produce a projection light flux of at least 3,000 lumens, an arc lamp, a barrel shutter arranged in the light beam produced by said arc lamp in the proximity of the projecting opening, a mercury lamp having an operative position within said shutter and an inoperative position outside the shutter, means to move said mercury lamp into and out of said positions, means for supplying cooling liquid and electric current to said mercury lamp, and means permitting the supply of said cooling liquid and electric current only when said mercury lamp is in one of its two operative positions.

JAN JESAYAS HARDENBERG.
FRANCISCUS LAMBERTUS VAN
WEENEN.
HENDRIK ANTOON HUBERT MARIE
NILLESEN.
JAN JACOB KOTTE.